United States Patent [19]

Bahner et al.

[11] 4,066,231
[45] * Jan. 3, 1978

[54] LOCKING STAND FOR SMALL, PORTABLE DEVICES

[76] Inventors: Randal E. Bahner, 220 "D". W. Carriage Drive, Santa Ana, Calif. 92707; Jay B. Haws, 431 Madrona Ave., Brea, Calif. 92621

[*] Notice: The portion of the term of this patent subsequent to Oct. 5, 1993, has been disclaimed.

[21] Appl. No.: 714,733

[22] Filed: Aug. 16, 1976

Related U.S. Application Data

[63] Continuation-in-part of Ser. No. 607,100, Aug. 25, 1975, Pat. No. 3,984,075.

[51] Int. Cl.² .............................................. F16M 13/00
[52] U.S. Cl. .......................................... 248/13; 70/58; 248/203
[58] Field of Search ................... 248/19, 23, 25, 203, 248/181, 13; 70/58, 232

[56] References Cited

U.S. PATENT DOCUMENTS

| 696,167 | 3/1902 | Forester | 248/181 |
|---|---|---|---|
| 1,962,548 | 6/1934 | Zerk | 248/181 |
| 2,497,797 | 2/1950 | Rogers | 248/203 X |
| 3,519,236 | 7/1970 | Schmidt et al. | 248/181 |
| 3,664,616 | 5/1972 | Raskin | 248/203 X |
| 3,707,860 | 1/1973 | Singer et al. | 248/25 X |
| 3,743,224 | 7/1973 | Singer et al. | 248/23 |
| 3,850,392 | 11/1974 | Gassaway | 248/203 X |

FOREIGN PATENT DOCUMENTS 71,880  3/1947  Norway ............................ 248/222.4

Primary Examiner—J. Franklin Foss
Attorney, Agent, or Firm—Knobbe, Martens, Olson, Hubbard & Bear

[57] ABSTRACT

A stand for a small, portable device which requires visual observation includes a base section, adapted to sitting on a support surface, connected through an adjustable friction swivel joint to a support member on which the portable device rests. A lock is provided for locking the portable device to the support surface through the swivel connector, the lock including a cable attached to the portable device and removable from the portable device only if the cable is first moved relative the support surface a predetermined distance. A padlock or nut prevents such movement of the cable, and thus prevents theft of the portable device.

10 Claims, 11 Drawing Figures

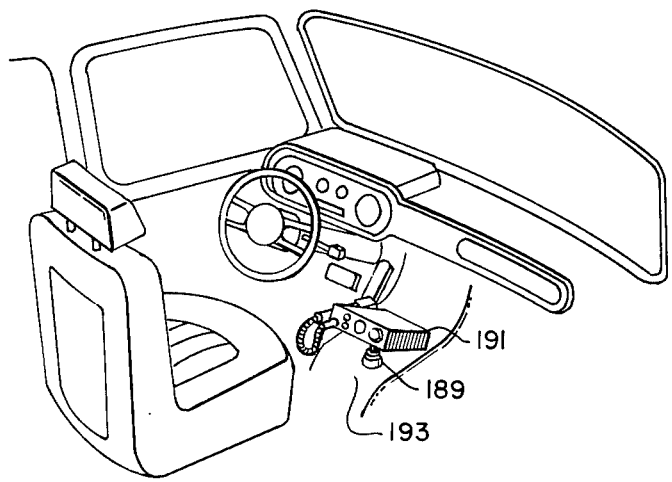
FIG. 9.
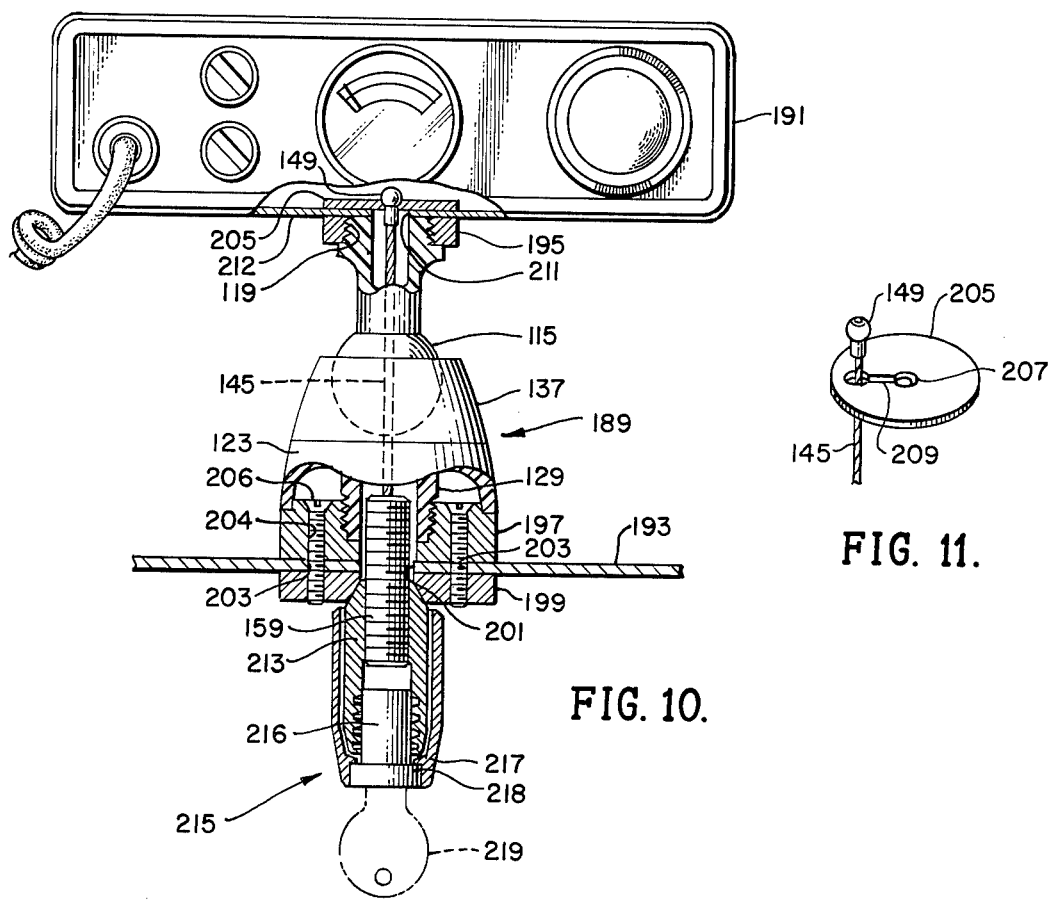
FIG. 11.
FIG. 10.

LOCKING STAND FOR SMALL, PORTABLE DEVICES

RELATED APPLICATIONS

This is a continuation in part of our patent application Ser. No. 607,100, filed Aug. 25, 1975, entitled "Hand Calculator Stand" U.S. now Pat. No. 3,984,075.

BACKGROUND OF THE INVENTION

The present invention is directed toward a stand for a portable or hand-held calculator or other small portable device requiring visual observation, such as citizenband radios, or other radios both on display at stores or in use and, more particularly, to a swivel stand permitting convenient operation of such portable devices and convenient reading of their displays.

Small hand-held electronic calculators, clocks, radios, and other devices have been sold in recent years in ever increasing numbers. These devices are generally suited to being held in one hand of a user of placed on a table or desk or in an automobile, and are oriented to permit the user to conveniently observe visual displays, such as meters, digital readouts, etc.

Devices of this type are not readily adaptable to desk use since, in order to maintain the compact size desirable for such devices, these machines normally have an extremely flat profile. Thus, they cannot be placed any appreciable distance from the user on a desk top or in an automobile, for example, and still adequately and comfortably be manipulated and read. Because of the low cost of these units, however, they are rapidly replacing many larger, less portable devices, which are designed for easier manipulation and reading. It is also readily recognized that the small size of these devices makes them particularly susceptible to theft, especially in circumstances where they are used on desk tops or in automobiles and left in place.

Even if such devices were propped up on a desk top or automobile floor to provide adequate manipulation and viewing, it would not provide comfortable use for an operator, since the position of the device and the position of the user will dictate various positions of the device to maximize user comfort.

SUMMARY OF THE INVENTION

The present invention alleviates these and other difficulties of the prior art by providing a support platform for a small, portable device requiring visual observation which allows pivoting to a variety of positions under frictional restraint so that, in any of the various positions, the device will be relatively stable. In addition, the present invention provides an adjustable frictional restraint so that the rigidity of the support may be adjusted.

In addition, the stand of the present invention permits locking the portable device on a desk top, sales display, automobile floor, or other support surface on which the stand is positioned, so that the device may be left unattended without fear of theft. The locking feature of the present invention additionally permits removal of the device from the locking assembly so that it may be used in a hand-held or portable configuration when it is not positioned on the support surface.

These and other features of the present invention are best understood through a reference to the drawings, in which:

FIG. 9 is a perspective view of an additional alternate embodiment locking swivel connector according to the invention, used for supporting a citizens band radio in an automobile;

FIG. 10 is a sectional view of the embodiment of FIG. 9 showing the details of construction thereof; and FIG. 11 is a perspective view of the locking plate of the embodiment of FIGS. 9 and 10.

DETAILED DESCRIPTION OF THE PREFERRED EMBODIMENT

Figure 1:
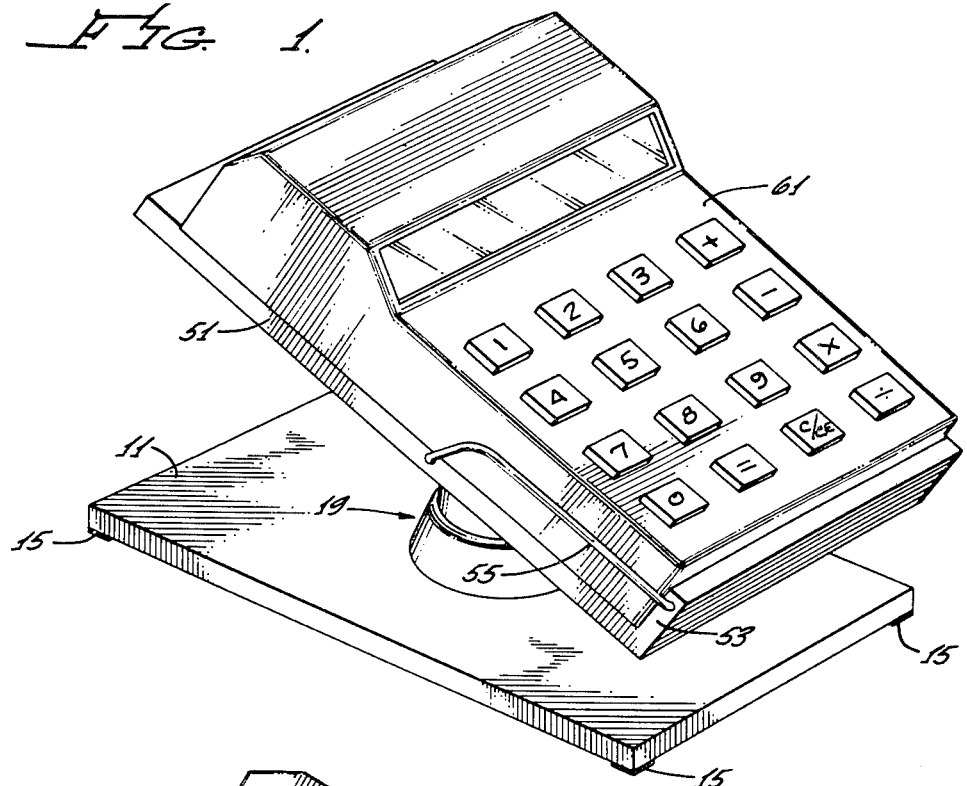
FIG. 1 is a perspective view of a calculator stand in accordance with the present invention.
Figure 2:
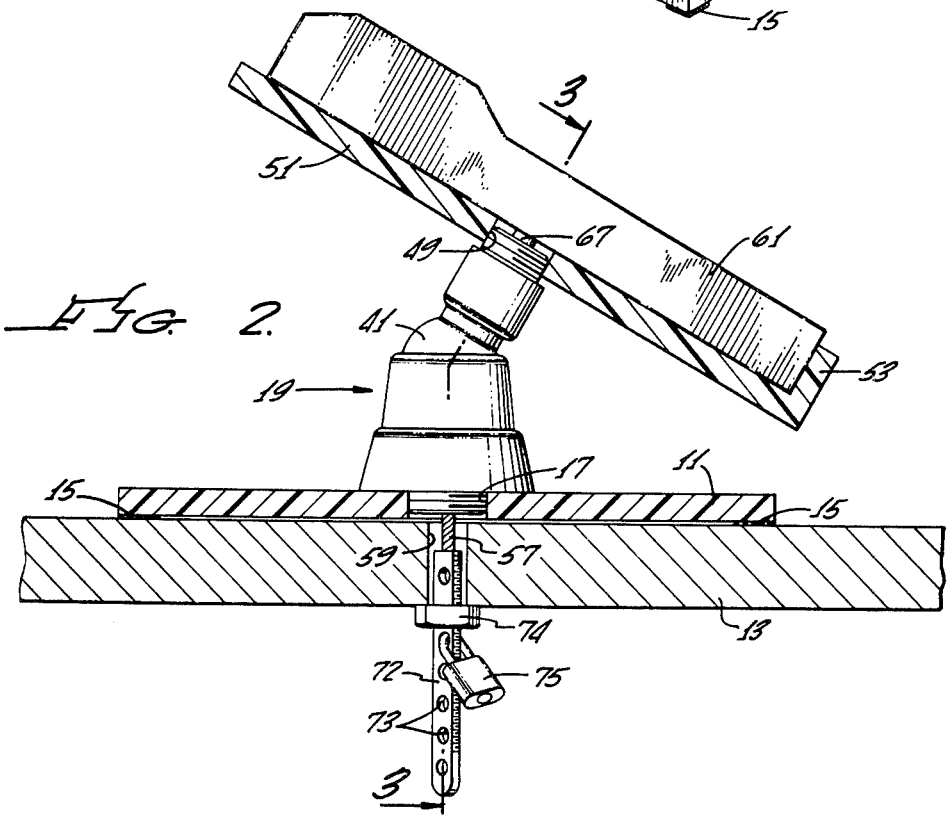
FIG. 2 is an elevation view, partially in section, showing various elements of the calculator stand of FIG. 1 and the locking apparatus, and additionally showing the desk top supporting the stand.
Figure 3:
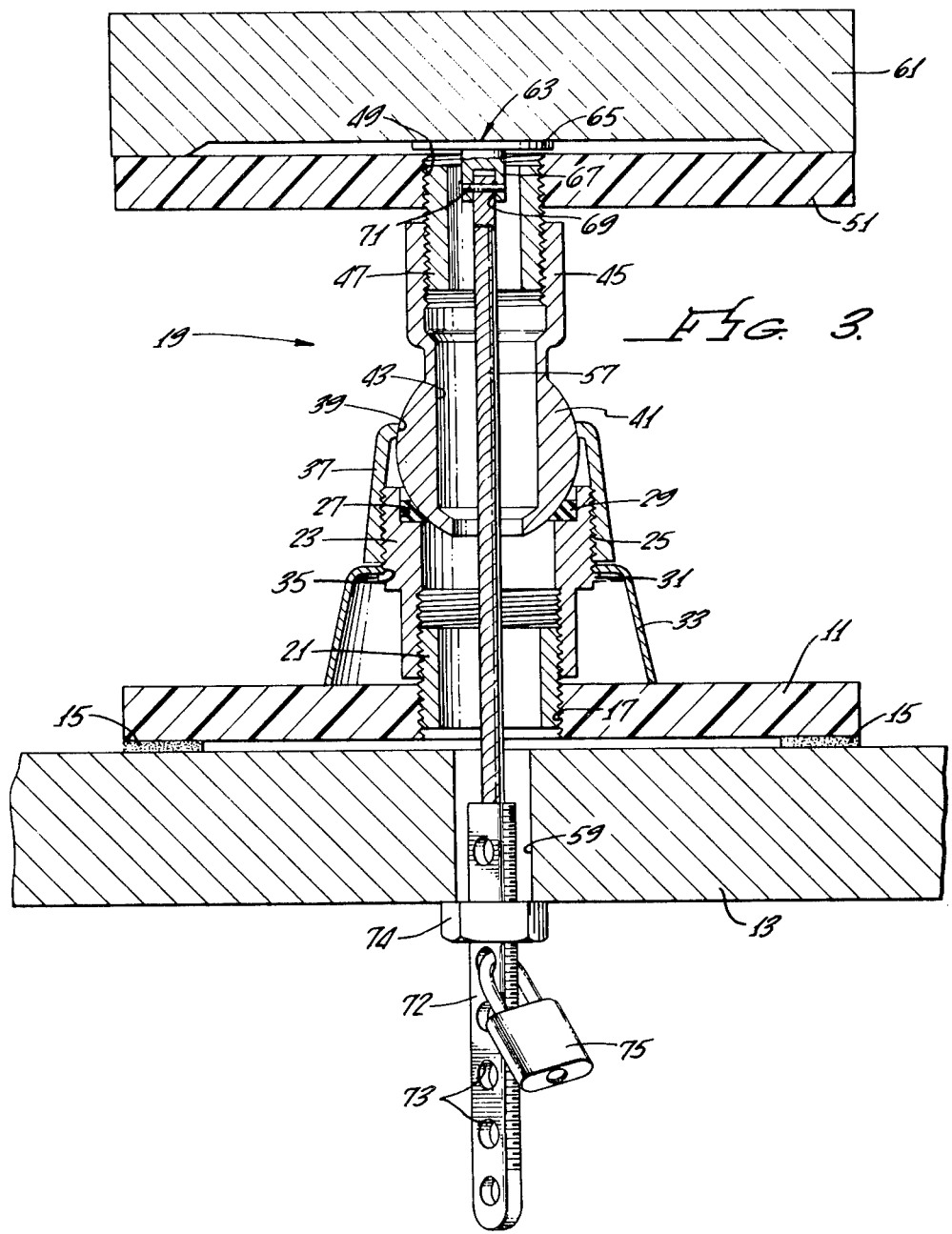
FIG. 3 is a sectional view, taken along lines 3—3 of FIG. 2, showing the details of the swivel ball and socket joint of the stand.

Referring initially to FIGS. 1, 2 and 3, a calculator stand in accordance with the present invention will be described. The stand includes a base platform 11 which may be manufactured of any rigid material and is conveniently relatively flat to conform to the flat top of a desk 13. The platform 11 may include a plurality of resilient feet 15, typically formed from sheet foamed polymer material, which may be attached, for example, at each corner if the platform 11 is rectangular, as shown. The platform 11, is a specific example has been manufactured of clear Lucite to provide an attractive stand. The flat base platform 11 is apertured at 17 to provide a passage for the locking mechanism which will be described below and to provide mounting for a swivel ball joint connector 19 of the calculator stand. The aperture 17 is preferably internally threaded to receive a threaded nipple 21 in the form of a tubular element which is externally threaded. The nipple 21 may conveniently be manufactured of polymer material such as polyvinylchloride and, through threaded engagement with both the based platform 11 and an internally threaded sleeve 23, provides rigid support for the swivel connector 19 on the base 11.

The threaded sleeve 23, in addition to internal threads which mate with the nipple 21, includes external threads 25 for adjusting the friction of the swivel joint 19 and an internal shoulder 27 for supporting an annular frictional element 29. The annular frictional element 29 may be, for example, a neoprene O-ring situated against the shoulder 27.

The threaded sleeve 23 additionally includes a flange 31 of increased diameter surrounding the outside of the threaded member 23 at the extremity of the thread 25 to provide a seat for a decorative cowling 33. This cowling 33 may be threaded at 35 to provide attachment to the threads 25 of the threaded member 23.

A cup member 37 together with the sleeve 23 provides the socket for the ball joint swivel connector 19. The cup member 37 includes an enlarged aperture 39 and is threaded onto the threads 25 to adjustably position the aperture 39 along the axis of the threaded member 23. The aperture 39 of the cup member 37 is smaller than the diameter of a spherical member 41 which forms the movable ball element of the ball joint swivel connector 19. The diameter of the friction element 29 is likewise smaller than the diameter of the spherical element 41 so that, when the threaded sleeve 37 is threaded onto the threaded member 23, the spherical member 41 is locked between the circular aperture 39 of the cup member 37 and the annular frictional element 29. The cup member 37 may be tightened onto the threaded member 23 to increase the friction between the frictional element 29 and the spherical element 41 to resist relative motion between these parts.

It will be recognized that the spherical element 41 is free to pivot about the center of the sphere 41 in any direction, limited only by the frictional contact between the spherical element 41 and the frictional element 29. The spherical element 41 includes a cylindrical central cavity 43 to provide a through aperture for the locking mechanism, as will be described below.

The spherical element 41 additionally includes a cylindrical extension 45, preferably formed unitarily with the spherical element 41, and internally threaded for receipt of a threaded nipple 47. This threaded nipple 47 is additionally threaded into the internal thread of an aperture 49 of an upper support plate 51 of the calculator stand. The threaded nipple 47 thus rigidly interconnects the spherical member 41 with the upper support plate 51 so that the upper support plate 51 is connected to the base platform 11 through the intermediate ball and socket swivel joint 19. This connection permits positioning of the upper support plate 51 at an infinite variety of positions comfortable to various calculator operators, and a relatively rigid maintenance of a selected position through the frictional contact between the spherical element 41 and frictional element 29.

The upper support plate 51 is preferably a flat rectangular sheet of rigid material which, in a specific example, may be Lucite. This upper support plate 51 may include an extending ledge 53 attached along one edge of the plate 51 and a pair of wire side supports 55 along opposite sides, connected to the upper support plate 51 and ledge 53. The ledge 53 and supports 55 partially enclose a hand-held calculator 61 and assure that it will not move relative the upper support plate 51.

If the locking mechanism, which will be described below, is not utilized, it can be seen that the base platform 11 may be placed on the top of a desk 13 and will rest immovably on the desk 13 due to the friction of the resilient feet 15. An operator may then swivel the upper support plate 51 to a desired position by overcoming the frictional contact of the frictional element 29 with the spherical element 41, and may utilize the calculator in this position. A tightening of the cup element 37 on the threaded member 23 will make the calculator more rigid in this selected position, while a loosening of this threaded interconnection will permit easy swivel adjustment.

A locking mechanism may be included in the calculator support stand of the present invention. As shown in FIGS. 2 and 3 the internal bore of the nipples 21 and 47, as well as the central cavities of the threaded member 23 and spherical member 41, provide a central aperture through the entire swivel mechanism 19. A flexible cable 57 may be passed through this central aperture and through a mating aperture 59 in the desk top 13 on which the calculator stand is placed. The cable 57 is attached to the hand-held calculator 61 by means of a connector 63 which is formed as a unitary element and includes an enlarged, typically circular, flange portion 65 and an extending cylindrical portion 67. The flat surface of the flange 65 opposite the cylindrical portion 67 is attached to the underside of the calculator 61 through adhesive or other rigid interconnecting means which prohibit removal of the calculator 61 from the connector 63. The cylindrical portion 67 includes an aperture 69 for receipt of one end of the flexible cable 57. A pin 71 passes through a lateral aperture in the cylindrical portion 67 and a lateral aperture in the end of the flexible cable 57 to fasten these elements together. The aperture within the cylindrical portion 67 which receives the pin 71 is spaced from the flange 65 by a substantial distance so that, if the cable 57 is sufficiently tight to prohibit lifting the calculator 61 and connector 63 away from the upper support plate 51, the pin 71 will not be accessible and can therefore not be removed since it is positioned within the nipple 47.

The other end of the cable 57 is rigidly attached to an elongated bar 72, preferably formed of metal. The bar 72 includes plural apertures 73 for accommodating desk tops 13 of different thickness. A padlock 75 is passed through one of these apertures 73 to lock the calculator 61 to the desk top 13. The plural apertures 73 are sufficiently close to one another so that an aperture may be selected for the padlock 75 which will prohibit the calculator from being lifted from the upper support plate 51 by a sufficient distance to permit access to the pin 71. Opposite edges of the elongate bar 72 may be threaded to receive a nut 74. This nut 74 is used to tighten the cable 57 by bearing against the underside of the desk top 13. The lock 75 prohibits loosening of the nut 74 sufficiently to permit access to the pin 71.

The calculator may be removed from the support stand and cable 57 by removing the padlock 75, loosening the nut 74, and lifting the calculator 61 from the upper support plate 51, permitting access to the pin 71 which may then be pressed out of the connector 63 and cable 57 to permit hand-held use of the calculator with the connector 63 remaining attached but the cable 57 removed.

Figure 4:
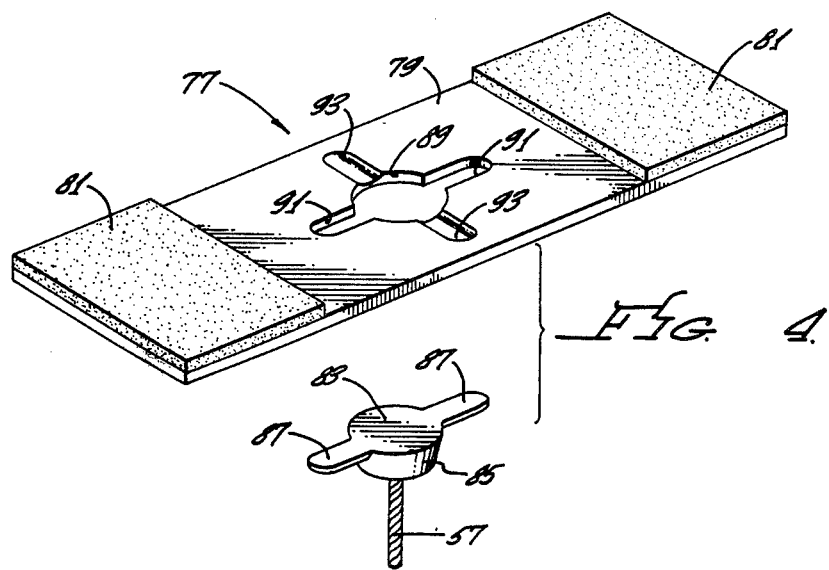
FIG. 4 is a perspective view of an alternate locking assembly for the calculator stand of FIG. 1.

Referring now to FIG. 4, an alternate connector for attaching the cable 57 to the underside of the calculator 61 will be described. In this alternate embodiment, a connector 77 is attached to the underside of the calculator 61 and includes a rigid flat plate 79 attached to a pair of spacer legs 81. The legs 81 are attached with adhesive or other rigid attaching means to the underside of the calculator 61. The legs 81 provide a slight offset for the plate 77 from the bottom of the calculator 61. The cable 57 is attached to a twist lock element 83 which includes a circular portion 85 and a pair of dogs 87 radiating from the circular portion 85. The locking plate 79 includes a circular aperture 89 in communication with a pair of radial slots 91 which pass completely through the plate 79. A pair of radially emanating depressions 93 communicate with the central aperture 89 on the surface of the plate 79 adjacent the calculator 61 but do not pass completely through the plate 79.

It can be seen that the dogs 87 may be passed through the slots 91 so that the dogs 87 may be positioned between the plate 79 and calculator 61. The twist lock 83 can then be rotated so that the dogs 87 rest within the depressions 93. As with the embodiment shown in FIG. 1, a padlock 75 may then be attached to the other end of the cable 57. The padlock 75 is passed through an aperture 73 in an elongate bar 72 attached to the cable 57, the aperture 73 being close enough to the bottom of the desk top 13 or nut 74 to prohibit the dogs 87 from being lifted completely out of the depressions 93 so that a rotation of the twist lock 83 is prohibited unless the padlock 75 is removed. Once the padlock is removed, the twist lock 83 may be lifted completely out of the depressions 93 and the space between the plate 79 and back of the calculator 71 provided by the legs 81 permits rotation of the dogs 87 between the plate 79 and calculator 61 to position the dogs 87 above the slots 91. Thus, the calculator 61 with its attached locking plate 77 may be removed from the cable 57 and stand for hand-held use.

Figure 5:
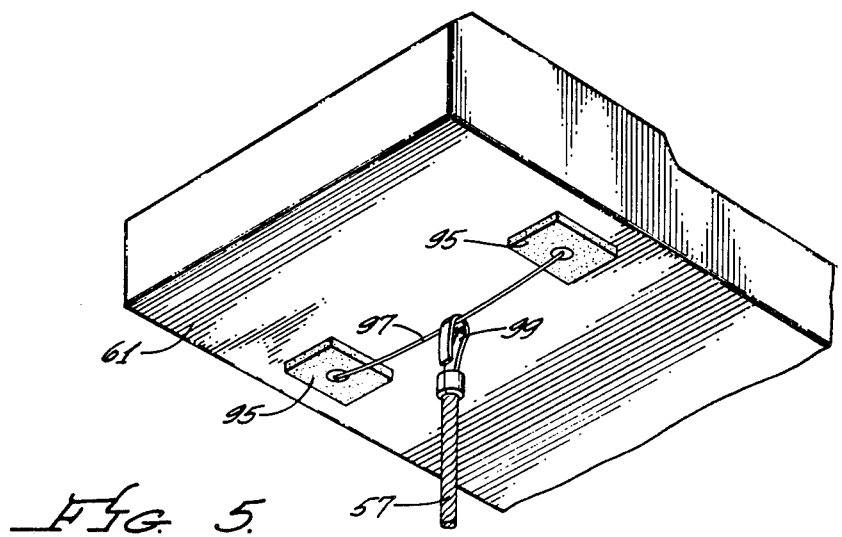
FIG. 5 is a perspective view of a second alternate locking mechanism for use with the calculator stand of FIG. 1.

Referring now to FIG. 5, an additional locking mechanism will be described. In this embodiment a pair of plates 95 are attached, as by adhesive or other rigid interconnecting means, to the back of a hand-held calculator 61. These plates 95 are each rigidly connected to a cable 97 which interconnects the plates 95. The cable 95 is relatively taut between the plates 95 and is adapted to interconnect with a rigid hook 99 attached to the end of the cable 57. The hook resides within the threaded nipple 47 shown in FIG. 3 when the calculator 61 is locked to the desk top 13, and it is impossible to remove the hook 99 from the wire 97 without lifting the calculator 61 a substantial distance to remove the hook 99 from the nipple 47. Such lifting is prohibited by the padlock 75, so that, as with the previous embodiments, the calculator is attached to the cable 57 by an interconnecting mechanism which prohibits disconnection so long as the padlock 75 is in place, since one of the interconnecting elements must be lifted out of the nipple 47 to unlock the mechanism. Once the padlock 75 has been removed, the cable 57 may be raised through the swivel connector 19 and the hook 99 may be removed from the cable 97 to provide hand-held use of the calculator 61.

The present invention thus provides a swivel connection platform for a hand-held calculator with an adjustable frictional contact for varying the force required to swivel the support plate 51. In addition, the present invention provides a locking mechanism which permits locking the calculator 61 to a desk top 13 through the swivel connector 19 while also providing hand-held use of the calculator 61 after removal of the attaching cable 57.

Figure 6:
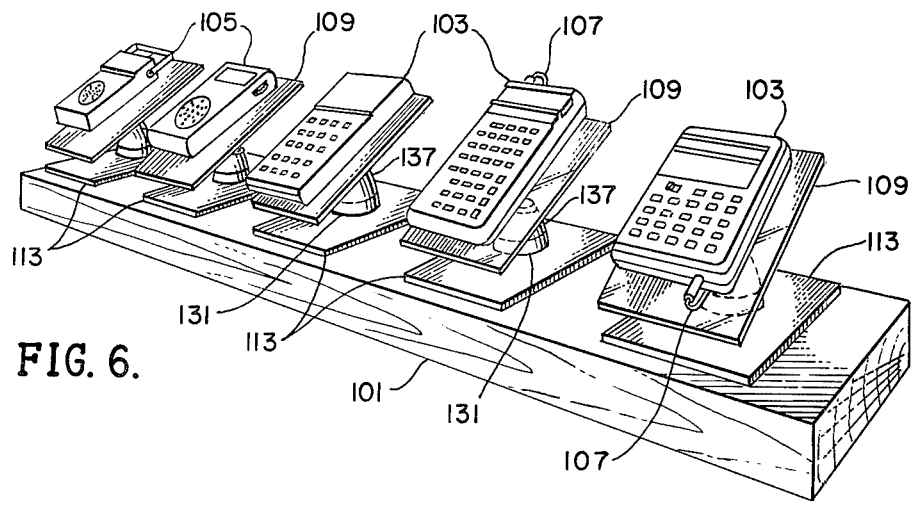
FIG. 6 is a perspective view of an alternate embodiment locking swivel connector according to the invention, used for supporting various small, portable devices for display in a store.
Figure 8:
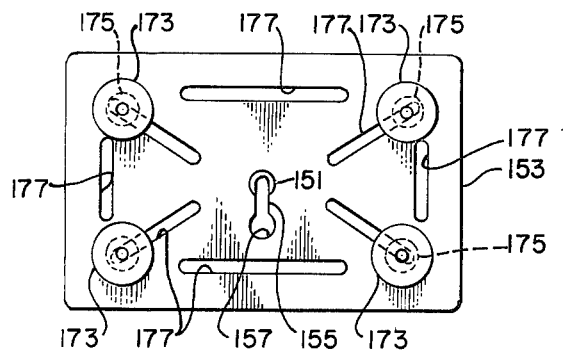
FIG. 8 is a plan view of the locking plate of the embodiment of FIGS. 6 and 7.
Figure 7:
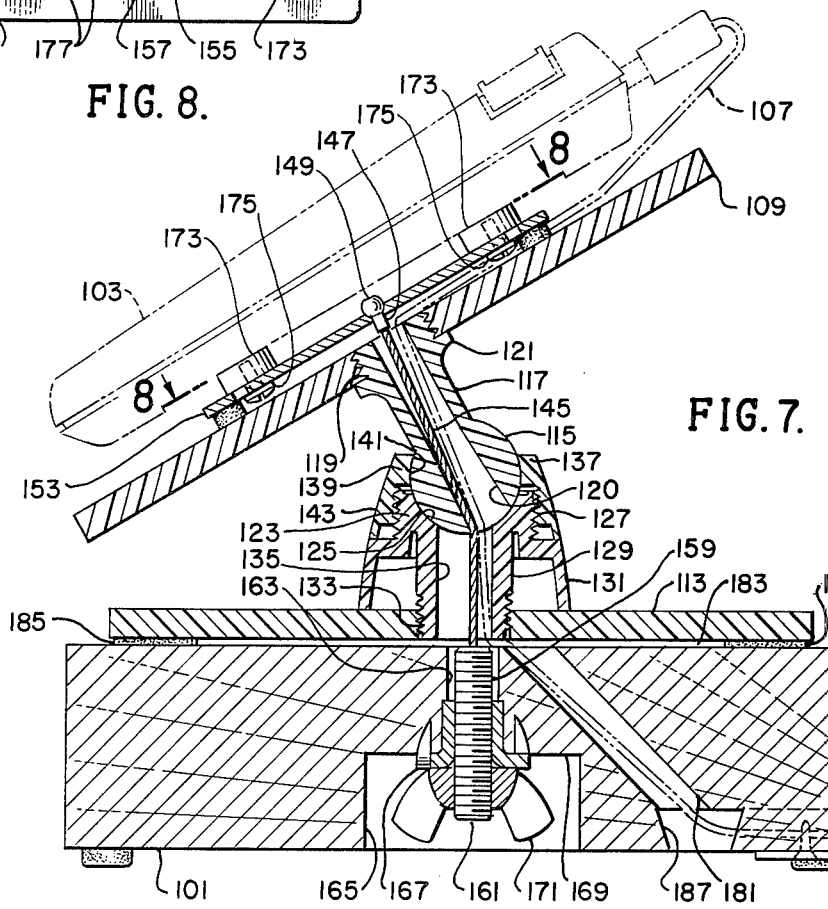
FIG. 7 is a sectional view of the embodiment of FIG. 6 showing the details of construction thereof.

Referring now to FIGS. 6, 7 and 8 an alternate embodiment of the present invention adapted to preventing theft of small portable devices requiring close visual inspection by the purchaser at the store will be described. In this embodiment a substantial display platform 101 formed for example from a relatively heavy large wooden plank is provided on a display case for other locations in a store and plural devices such as calculators 103 and portable radios 105 are locked to the platform 101. Thus while any of the devices 103, 105 might be easily stolen from the premises of the store individually it is virtually impossible for a thief to carry the entire assembly including the support 101 from the store and theft is therefore discouraged. In this embodiment provision is also made for connecting electrical power cables such as the cables 107 to a power source so that the devices 103, 105 may be continually operated in the store and thus carefully inspected by potential customers without relying on the batteries typically included in the devices 103, 105. The swivel connector invention is particularly advantageous in a display such as that shown in FIGS. 6 through 8 since it permits plural customers to observe different devices 103, 105 simultaneously each pointing the device in which he is interested toward him for manipulation and manipulating.

Referring specifically to FIGS. 7 and 8 the device of this embodiment includes an upper platform 109 and a lower platform 113, the platform 109 designed to directly support the portable device 103 and the lower platform 113 designed to sit on the upper face of the support block 101. The swivel connector of this embodiment comprises a spherical ball member 115 which includes an elongate tubular extension 117 which is threaded at one end 119 and provided with a larger diameter shoulder 121 adjacent the threads 119 and aperture 120 aligned centrally tubular with the member 117 passes completely through the ball element 115, including the tubular member 115 and threads 119.

The ball element 115 is seated within a ball receptacle element 123 including a spherical recess 125 having the same diameter as the ball element 115 for engaging and supporting the ball element 115.

The ball receptacle 123 includes an outer cylindrical portion 127 adjacent the spherical recess 125 and a pair of concentric tubular extensions 129 and 131. An extension 129 is externally threaded at 133 and extends further than the tubular extension 131 which provides a stable place for the ball receptacle 123.

The fitted extension 129 is engaged by threading with the lower platform 113 and this threading causes abuttment at platform 113 with the tubular extension 131 to rigidly secure the ball receptacle 123 to the platform 113. The inside diameter 135 of the tubular extension 129 provides an extension of the open conduit through the swivel joint and communicates with the aperture 120 which passes through the spherical member 115. Thus the swivel joint is formed to provide a through conduit for permitting locking of the calculator 103 or other device requiring visual observation to the plank 101 in the manner described below.

A ball retainer and friction element 137 includes an annular shoulder 139 provided with a spherical inner surface 141 for contact with the spherical member 115. The retainer 137 also includes a tubular extension 143 which is internally threaded for engagement with the threads 127. The extension 143 advantageously corresponds in diameter with the extension 131 to lend a smooth overall appearance to the swivel connector.

It can be seen that tightening of the retainer member 137 onto the threads 127 of the receptacle 123 will increase the frictional engagement of the retainer 137 and spherical member 115, thereby increasing the resistance of the swivel joint to swivel action. The user of the device by adjusting the retainer 137 may therefore alter the frictional resistance to the swivel joint to movement so that the upper platform 109 will remain stable during use but still may be adjusted to various positions of rotation about the swivel axis at the spherical member 115 by overcoming the frictional resistance.

A flexible elongate cable 145 formed for example of steel passes through the open conduit through the open swivel joint. This cable 145 is attached as by swaging through an enlarged end 147 which includes a spherical locking member 149. This locking member 149 is designed to seat within a spherical recess 151 in a locking plate 153 best shown in FIG. 8. The spherical recess 151 forms a depression in the upper surface of the plate 153 for receiving the spherical member 149. The plate 153 in addition includes a slot 155 which passes through the plate 153 and extends to the center of the spherical indentation 151 to permit passage of the enlarged end 147 on the cable 145 through the plate 153. The other end of the slot 155 is enlarged at 157 to permit passage of the spherical member 149 through the plate 153, thus the enlarged end 147 of the cable 145 may be positioned on the lockplate 153 by passing the spherical end 147 along the slot 155 to a position so member 149 will seat within the spherical recess 151.

At the other end of the cable 145 a threaded rod 159 is attached to the cable 145 as by swaging or welding. The rod 159 is advantageously counterboard at its end 161 to permit rotation of the rod 159 using a screwdriver or an allen wrench. The rod 159 passes through a bore 163 in the plank 101 which is slightly larger than the rod 159. This bore 163 communicates with the surface of the plank as well as with a much larger bore 165 in the lower surface of the plank 101. A "T" nut 167 is embedded in the shoulder 169 formed by the junction of the bores 163 and 165. This "T" nut 167 is internally threaded to engage the threaded rod 159. Once the spherical member 149 has been positioned in the spherical recess 151 the rod 159 may be threaded along the "T" nut 167 to withdraw the rod 159 and cable 145 toward the lower surface of the plank 101, tightening the cable 145 and securely sealing the spherical member 149 and the recess 151. A lock nut such as wing nut 171 may then be firmly embedded onto the rod 159 and into engagement with the "T" nut 167 to lock the cable 145 in tension.

It can be seen that so long as the tension of cable 145 is not released the spherical member 149 cannot be disengaged from the spherical indentation 151 in the locking plate 153. The locking plate 153 may in turn be attached firmly to the calculator 103 or other small portable device by gluing four small pads 173 to the underside of the case of the portable device 103. Screws 175 may then be passed through plural slots 177 in the locking plate 153 and engage with threaded apertures in the pads 173. The slots 177 permit such engagement at a variety of locations of the back of a portable device 103 to assure that the pads 173 may be placed at locations which do not interfere with the normal operation of the device 103. The screws 175, of course, cannot be removed unless the locking plate 153 is removed from the upper platform 109. Thus the cable 145 prevents theft of the device 103 since a thief would have to lift the entire plank 101 and remove it or unscrew the locking wing nut 171 and with an allen wrench or screwdriver unscrew the threaded rod 159 to release the tension on cable 145 before removal of the device 103 would be possible.

The conduit through the swivel joint made up of the bores 120 and 135 has a second advantage. A power cable 107 operating the device 103 may be passed as shown between the platform 109 and the locking plate 153 and from this location passed through the conduit through the swivel joint. A second through aperture 181 in a plank 101 preferably inclined at an angle relative the aperture 163 communicates with a small space 183 between the lower platform 113 and plank 101. This space 183 is provided by plural friction feet 185 attached to the lower surface of the platform 113. The electrical cord 107 thus passes through this space 183 and bore 181 to exit underneath the plank 101 as by means of a slot 187 on the underside of the plank 101. The cable 107 may then be attached at its other end to a power source to provide continuous power for the display device 103.

It can thus be seen that the embodiment of FIGS. 6, 7 and 8 provides an anti-theft swivel platform for a store display for small portable devices requiring visual inspection. Each of the devices may be independently swiveled but they may not be removed from the plank 101 without first relieving the tension on the cables 145. Since theft of such small devices would otherwise be relatively easy, the present invention provides substantial security for display units in stores.

Referring now to FIGS. 9, 10 and 11 another embodiment of the locking swivel connector of the present invention will be described. In this embodiment as shown in FIG. 9, the swivel connector 189 is utilized to support a citizens band radio 191 on the transmission hump 193 of an automobile. The citizens band radio 191 typically has dials and meters which must be visually observed by the driver or his passenger and often require manipulation. The swivel connector 189 permits the citizen bank radio 191 to be inclined and directed toward the driver or his passenger for comfortable use. At the same time the swivel connector 189 provides a secure lock for the citizen band radio 191 preventing its theft from the automobile.

Referring particularly to FIGS. 10 and 11 the details of construction of this embodiment will be described. The spherical member 115, receptacle 123 and engaging member 137 are identical to the embodiment of FIG. 7. In this instance, however, a small internally threaded washer 195 is threaded onto the threads 119 to provide a small but stable platform for the citizens band radio 191. At the other end of the swivel joint a larger internally threaded annular washer 197 is threaded onto the intertubular member 129 to form a support base for supporting the receptacle 123 on the sheet metal on the transmission hump 193 of the automobile. In this instance, prior to threading the intertubular member 129 onto the washer 197, this washer 197 is first secured to an additional washer member 199 positioned beneath the transmission hump 193. In order to accomplish this the first diameter hole 201 is made in the transmission hump 193 flanked by two smaller holes 203. The washer 197 includes bores 204 for receiving a pair of screws 206 which are separated by a spacing identical to that of the apertures 203. The screws 206 are threaded into mating threaded apertures in the washer 199. Thus the screws 206 clamp the washers 197 and 199 to the transmission hump 193. The swivel joint 189 is then floated into the washer 203.

A small washer 205 shown in detail in FIG. 11 includes a spherical recess 207 and slot 209 identical to the recess 151 and slot 155 of the embodiment of FIG. 8. The enlarged spherical end 149 on the cable 145 which is also identical to that in the embodiment of FIG. 7 is passed through the slot 209 and drawn downwardly to engage the spherical recess 207. A hole 211 is formed in the bottom plate 212 of the citizens band radio 191 and the washer 205 is placed within the citizens band radio above this hole 211. The cable 145 is then engaged with the spherical indentation 207 as in the prior embodiment.

In this embodiment, however, a large nut 213 engages the threaded rod 159 attached to the cable 145 and draws the rod 159 and cable 145 taut to lock the washer 205 and citizens band radio 191 firmly against the washer 195 and swivel joint 189. A locking mechanism 215 may then be used to prevent unscrewing of the nut 213. This locking mechanism 215 is identical to that used in preventing the theft of custom automobile wheels and includes a shell 217 which freely rotates about the nut 213 but is removable from the nut 213 by the placement of a key 219 within a locking barrel 216 retaining the shell 217 by means of a shoulder 218. Once the shell 217 has been removed, access to the nut 213 for relieving tension on the cable 145 is permitted. With the shell 217 in place, since the shell 217 freely rotates, the nut 213 cannot be manipulated. It can thus be seen that the present invention provides an anti-theft device coupled with a swivel stand for small portable devices requiring visual observation for manipulation. In the embodiment of FIGS. 9 through 11 as in the embodiment of FIGS. 6 through 8, a power cord for the citizens band radio 191 may be passed through the aperture within the swivel connector 189 and connected to the vehicle battery for powering the citizens band radio.

We claim:

1. A stand for locking small portable equipment requiring visual observation from plural viewing angles on a support surface, comprising:
    a ball and socket swivel joint having a pair of elements attached to swivel relative one another;
    means for supporting one element of said swivel joint on said support surface;
    means for supporting said small portable equipment on the other element of said swivel joint to permit said small portable equipment to swivel relative said support surface;
    said swivel joint, said means for supporting one element of said swivel joint and said means for supporting said small portable equipment including apertures, said apertures aligned to provide a conduit through said stand; and
    an elongate, flexible member attached at one end to said small, portable equipment, passing through said conduit provided by said aligned apertures, and attached at the other end to said support surface to prevent removal of said small, portable equipment from said support surface.

2. A stand for locking small, portable equipment as defined in claim 1 additionally comprising:
    a locking plate rigidly attached to said small portable equipment, said plate including a surface depression communicating with a slot passing through said plate, said slot having an enlarged end; and
    an enlargement on said one end of said flexible member, said enlargement being small enough to pass through said enlarged end of said slot, and sized to be received in said surface depression of said plate for engaging said surface depression and plate.

3. A stand for locking small, portable equipment as defined in claim 2 additionally comprising:
    a lock removably attachable to said other end of said flexible member and engaging said support surface to prohibit axial movement of said elongate, flexible member relative said support surface.

4. A stand for locking and supporting small, portable equipment requiring visual observation on a support surface, comprising:
    a platform for supporting said portable equipment;
    means for supporting said platform on said support surface, including means for tilting said platform to any selected one of a plurality of positions on said desk top; and
    flexible locking means connected to said support surface at one end, passing through said platform and said supporting means and connected to said portable equipment at the other end for locking said portable equipment to said support surface.

5. A stand for supporting small portable equipment requiring visual observation on a support surface, comprising:
    a swivel ball and socket joint for positioning said portable equipment relative said support surface; and
    an elongate, flexible locking mechanism passing through said swivel joint and attached to said portable equipment at one end and said support surface at the other end for locking said portable equipment to said support surface.

6. A stand for supporting small, portable equipment requiring visual observation as defined in claim 5 wherein said swivel ball and socket joint includes a through conduit, and wherein said locking mechanism comprises a flexible cable passing through said conduit.

7. A stand for locking and supporting small portable equipment requiring visual observation on a support surface, comprising:
    a swivel ball and socket joint for positioning said portable equipment relative said support face;
    means holding said portable equipment on said swivel joint; and
    an elongate flexible locking mechanism passing through said swivel joint and attached to said holding means at one end and said support surface at the other end, said portable equipment being securely mounted onto said holding means, and locking said holding means with said portable equipment mounted thereto to said support surface.

8. A stand for locking small portable equipment requiring visual observation from plural viewing angles on a support surface, comprising:
    a ball and socket swivel joint having a pair of elements attached to swivel relative one another;
    means for supporting one element of said swivel joint on said support surface;
    means for supporting said small portable equipment on the other element of said swivel joint to permit said small portable equipment to swivel relative said support surface;
    said swivel joint and said means for supporting one element of said swivel joint including apertures, said apertures aligned to provide a conduit through said stand; and
    an elongate flexible member attached at one end to said means for supporting said small portable equipment, passing through said conduit provided by said aligned apertures, and attached at the other end to said support surface to prevent removal of said small portable equipment from said support surface.

9. A stand for locking and supporting small portable equipment requiring visual observation on a support surface comprising:
    a swivel ball and socket joint for positioning said portable equipment relative said support surface including apertures therethrough; and an elongage flexible locking member passing through said apertures, said elongate flexible member locking said small portable equipment onto said ball and swivel joint.

10. A stand for locking small portable equipment on a support surface, comprising:
a ball and socket swivel joint having a pair of elements attached to swivel relative one another;
means for supporting one element of said swivel joint on said support surface;
means for supporting said small portable equipment on the other element of said swivel joint to permit said small portable equipment to swivel relative said support surface;
said swivel joint, said means for supporting one element of said swivel joint and said means for supporting said small portable equipment including apertures, said apertures aligned to provide a conduit through said stand; and
an elongate, flexible member attached at one end to said small, portable equipment, passing through said conduit provided by said aligned apertures, and attached at the other end to said support surface to prevent removal of said small, portable equipment from said support surface.

* * * * *

UNITED STATES PATENT AND TRADEMARK OFFICE
CERTIFICATE OF CORRECTION

PATENT NO. : 4,066,231

DATED : January 3, 1978

INVENTOR(S) : Randal E. Bahner and Jay B. Haws

It is certified that error appears in the above-identified patent and that said Letters Patent are hereby corrected as shown below:

Column 1, line 21, change "of" to --or--.

Column 2, line 44, change "is" to --in--.

Signed and Sealed this

Ninth Day of May 1978

[SEAL]

Attest:

RUTH C. MASON
Attesting Officer

LUTRELLE F. PARKER
Acting Commissioner of Patents and Trademarks